US012171035B2

(12) United States Patent
Zaev et al.

(10) Patent No.: US 12,171,035 B2
(45) Date of Patent: Dec. 17, 2024

(54) END-TO-END SYSTEM DESIGN FOR THz NETWORK

(71) Applicant: Apple Inc., Cupertino, CA (US)

(72) Inventors: Danila Zaev, Munich (DE); Ayman F. Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 17/843,781

(22) Filed: Jun. 17, 2022

(65) Prior Publication Data
US 2023/0413354 A1 Dec. 21, 2023

(51) Int. Cl.
*H04W 76/15* (2018.01)
*H04L 5/00* (2006.01)
*H04W 72/0453* (2023.01)
*H04W 72/53* (2023.01)

(52) U.S. Cl.
CPC .......... *H04W 76/15* (2018.02); *H04L 5/0044* (2013.01); *H04W 72/0453* (2013.01); *H04W 72/53* (2023.01)

(58) Field of Classification Search
CPC . H04W 76/15; H04W 72/0453; H04W 72/53; H04W 16/28; H04L 5/0044; G01S 19/46; G01S 19/47
See application file for complete search history.

(56) References Cited

U.S. PATENT DOCUMENTS

2018/0324738 A1* 11/2018 Stirling-Gallacher ... H04B 7/04
2020/0275402 A1* 8/2020 Shi ........................ H04W 76/11

* cited by examiner

Primary Examiner — Thai Nguyen
(74) Attorney, Agent, or Firm — Kowert, Hood, Munyon, Rankin & Goetzel, P.C.

(57) ABSTRACT

Methods, systems, and apparatuses are presented for utilizing a narrowband assisting network (NBAN) and a positioning assisting network (PAN) to assist in establishing and managing communications on a THz band wireless communication network. The THz network may be capable of transmitting/receiving with high bandwidth, but may be resource intensive and may be constrained to line-of-sight (LoS) communications. The NBAN and PAN may help to minimize the resources consumed by the THz network. The NBAN may identify a set of nodes of the THz network as candidates for establishing a connection with a user equipment (UE). The PAN may determine a position of each candidate relative to the UE, and may communicate the position to the respective candidate and to the UE, which may use the position information to expedite a beam alignment procedure. The NBAN may provide scheduling and other control signaling for the THz network.

20 Claims, 9 Drawing Sheets

END-TO-END SYSTEM DESIGN FOR THz NETWORK

TECHNICAL FIELD

The present application relates to wireless communication, including to techniques for coordinating multiple networks to support a THz network.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

To satisfy ever-increasing demand for additional bandwidth, networks are employing new frequency ranges. Performing communications in the THz band may provide significant bandwidth. However, such frequency ranges may introduce network constraints that are significantly different from those of traditional wireless communication networks.

Accordingly, improvements in the field are desired.

SUMMARY

Embodiments are presented herein of, inter alia, systems, apparatuses, and methods for utilizing a narrowband assisting network (NBAN) and a positioning assisting network (PAN) to assist in establishing and managing communications on a THz band wireless communication network.

A user equipment (UE) device is presented, including first communication circuitry configured to communicate with a first wireless communication network according to a first radio access technology (RAT), second communication circuitry configured to communicate with a second wireless communication network according to a second, different RAT, and third communication circuitry configured to communicate with the third wireless communication network according to a third, different RAT. The first communication circuitry may be configured to receive information indicating a position, relative to the UE, of a network node of a third wireless communication network. The second communication circuitry may be configured to receive scheduling information from a network node of the second wireless communication network, the scheduling information indicating resources to be used by the UE device for performing a beam alignment procedure with the network node of the third wireless communication network. The third communication circuitry may be configured to perform the beam alignment procedure with the network node of the third wireless communication network according to the scheduling information.

In some scenarios, communications according to the third RAT may be limited to line-of-sight (LoS) communications. In some such scenarios, the LoS communications may include multi-hop LoS communications.

In some scenarios, the third RAT may be limited to communication frequencies above 100 GHz.

In some scenarios, the first communication circuitry may be configured to receive information indicating respective positions, relative to the UE, of a plurality of network nodes of the third wireless communication network. The second communication circuitry may be configured to receive scheduling information indicating respective resources to be used by the UE device for performing beam alignment procedures with a plurality of network nodes of the third wireless communication network. The third communication circuitry may be configured to perform the respective beam alignment procedures with the plurality of network nodes of the third wireless communication network according to the scheduling information.

In some scenarios, the second communication circuitry may be further configured to receive second scheduling information from the network node of the second wireless communication network, the second scheduling information indicating resources to be used by the UE device for communicating payload data to and/or from the network node of the third wireless communication network. The third communication circuitry may be further configured to transmit and/or receive the payload data to/from the network node of the third wireless communication network according to the third RAT.

In some scenarios, the first communication circuitry may be further configured to provide information indicating a position, relative to the UE device, of an intelligent reflecting surface (IRS) associated with the UE device. The UE device may further include a processor configured to determine phase shift coefficients for use by the IRS to configure the IRS to reflect communication beams between the UE device and the network node of the third wireless communication network, wherein the phase shift coefficients are determined based on the information indicating the position of the IRS and the information indicating the position of the network node of the third wireless communication device.

In some scenarios, the second communication circuitry may be further configured to provide, to the network node of the second wireless communication network, an indication of whether the beam alignment procedure was successful.

A method is disclosed for controlling communications on a THz band wireless communication network by an assisting network. The assisting network may establish a wireless communication connection with a user equipment (UE) device according to a first radio access technology (RAT). The assisting network may determine a set of nodes of the THz band wireless communication network to be considered as candidates for establishing a connection with the UE device according to a second RAT, the second RAT being supported by the THz band wireless communication network; and identify the determined set of nodes to a positioning network that operates according to a third RAT. The assisting network may receive, from the positioning network, position information for the nodes of the determined set of nodes, the position information indicating the positions of the nodes relative to the UE device. The assisting network may schedule resources for the UE device to perform a beam alignment procedure with a first node of the determined set of nodes according to the second RAT, wherein the resources are scheduled based at least in part on the position information. The assisting network may transmit an indication of the scheduled resources to the UE device according to the first RAT.

In some scenarios, the assisting network may communicate an indication of the scheduled resources to the first node.

In some scenarios, the assisting network may receive an indication that the beam alignment procedure was successfully performed between the UE device and the first node. After receiving the indication, the assisting network may schedule resources for transmission of payload data between the UE device and the first node according to the second RAT.

In some scenarios, the assisting network may receive, from the THz band wireless communication network, information regarding transport buffer status of the first node, wherein the resources for transmission of payload data are scheduled to allow transmission of a complete application protocol data unit (PDU).

In some scenarios, the set of nodes may be determined based on an estimation of likelihood that the nodes can establish a line-of-sight (LoS) path to the UE device.

A method is disclosed for establishing communications on a THz band wireless communication network. A node of the THz band wireless communication network may receive, from a positioning network, information indicating a position of a user equipment (UE) device, relative to the node. The node may also receive, from an assisting network, scheduling information indicating resources of the THz band wireless communication network to be used by the node for performing a beam alignment procedure with the UE device. The node may perform the beam alignment procedure with the UE device using the indicated resources.

In some scenarios, communications on the THz band wireless communication network may be limited to line-of-sight (LoS) communications. In some such scenarios, the LoS communications may include multi-hop LoS communications.

In some scenarios, communications on the THz band wireless communication network may be limited to communication frequencies above 100 GHz.

In some scenarios, the node may receive, from the assisting network, second scheduling information indicating resources to be used by the node for transmitting payload data to the UE device on the THz band wireless communication network; and transmit the payload data to the UE device using the indicated resources.

In some scenarios, the node may inform the assisting network whether the beam alignment procedure was successful.

In some scenarios, the node may provide to the assisting network an estimate of when a L2 transport buffer of the node will assemble a complete application PDU, the estimate usable by the assisting network in determining resource scheduling.

Apparatuses and systems are disclosed for implementing the above methods.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
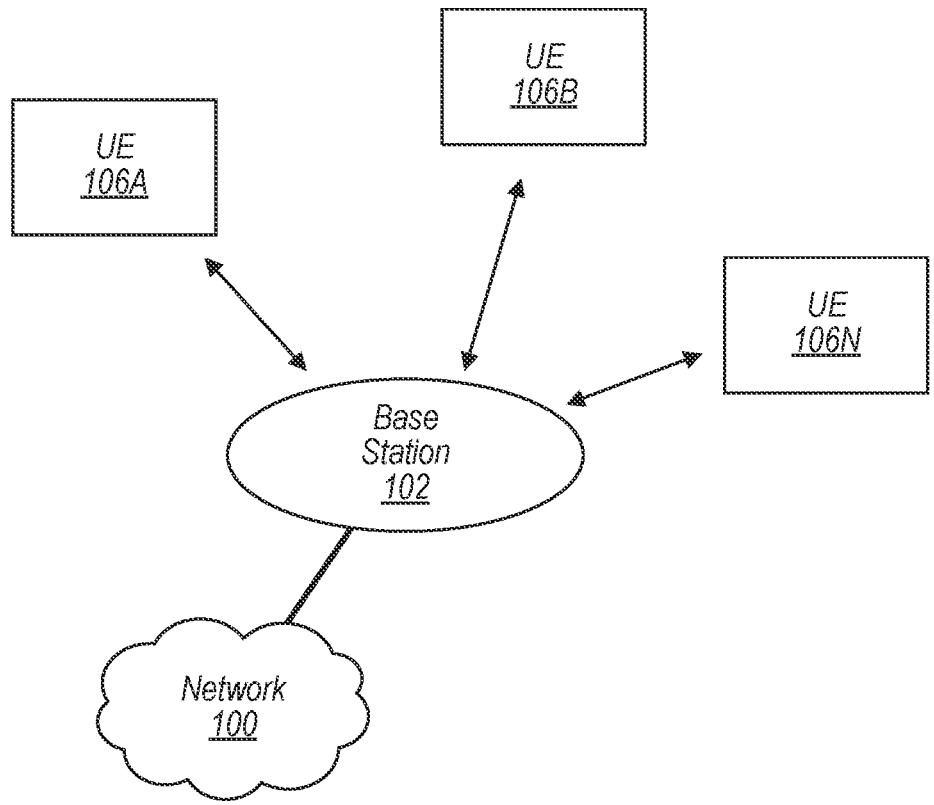
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

EUTRA: Evolved UMTS Terrestrial Radio Access
FDM: Frequency Division Multiplexing
GSM: Global System for Mobile Communication
IAB: Integrated Access Backhaul
IRS: Intelligent Reflecting Surface
LoS: Line of Sight
LTE: Long Term Evolution
MAC: Medium Access Control
NB: Narrowband
NBAN: Narrowband Assisting Network
NR: New Radio
PAN: Positioning Assisting Network
PDCP: Packet Data Convergence Protocol
PDU: Protocol Data Unit
RAT: Radio Access Technology
RF: Radio Frequency
RLC: Radio Link Control RU: Radio Unit
RX: Reception/Receive
SDAP: Service Data Adaptation Protocol
TDM: Time Division Multiplexing
TRP: Transmission and Reception Point
TX: Transmission/Transmit
UE: User Equipment
UMTS: Universal Mobile Telecommunication System
UWB: Ultra Wideband Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), virtual/augmented reality devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
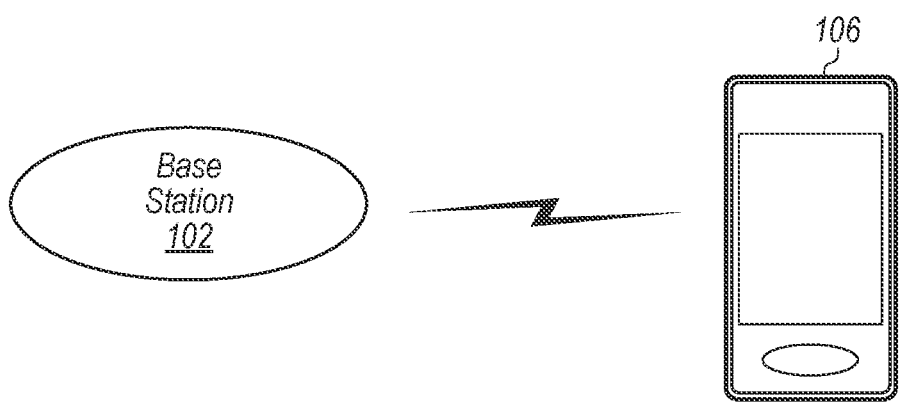
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an "eNodeB" or "eNB". If the base station 102 is implemented in the context of 5G NR, it may alternately be referred to as a "gNodeB" or "gNB". The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, THz network, 3GPP2 CDMA2000 (e.g., 1xRTT, 1xEV-DO, HRPD, eHRPD), Wi-Fi, UWB, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to utilize a double-assisted THz network, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, a virtual/augmented reality device, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, THz network, UWB, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM or THz network), and separate radios for communicating using each of Wi-Fi and BLUETOOTH™. Other configurations are also possible.

Figure 3:
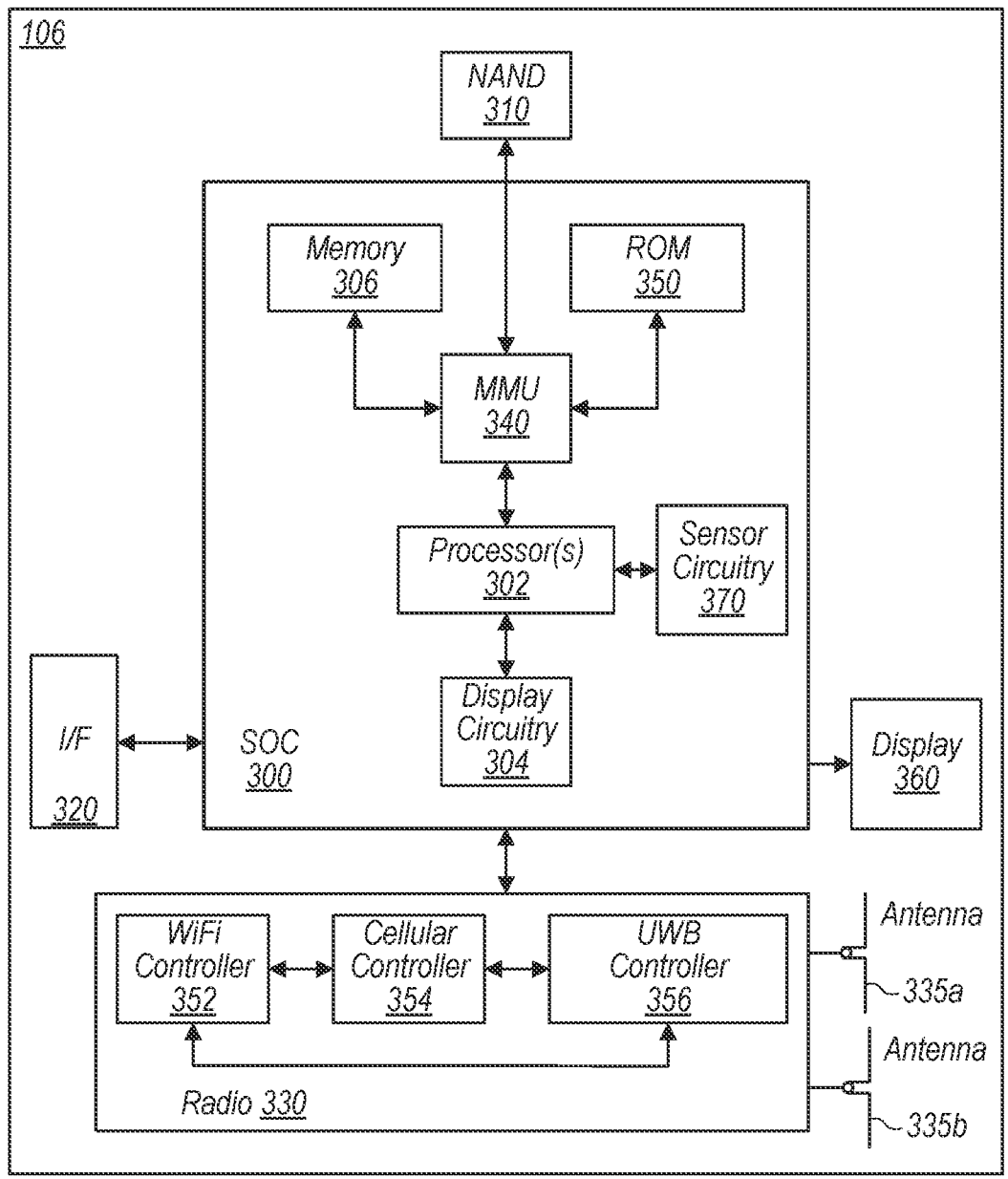
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. In some implementations, the display 360 may include a touchscreen capable of detecting user input, e.g., as touch events. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, THz network, CDMA2000, BLU-ETOOTH™, Wi-Fi, UWB, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to utilize a double-assisted THz network, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to utilize a double-assisted THz network according to various embodiments disclosed herein. Processor(s) 302 may also implement various other applications and/or end-user applications running on UE 106.

In some embodiments, radio 330 may include separate controllers and/or other communication circuitry dedicated to performing communications for various respective RAT standards. For example, as shown in FIG. 3, radio 330 may include a Wi-Fi controller 352, a cellular controller (e.g., LTE, LTE-A, NR, THz network) 354, and UWB controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or UWB controller 356 may communicate with cellular controller 354 over a cell-ISM link, etc. While three separate controllers are illustrated within radio 330, other embodiments have fewer or more similar controllers for various different RATs that may be implemented in UE device 106.

For example, the cellular controller 354 may include shared and/or separate communication circuitry configured to communicate according to different RATs. For example, the cellular controller 354 may include communication circuitry for implementing LTE-A, communication circuitry for implementing sub-6 GHz NR, communication circuitry for implementing mmWave NR, and communication circuitry for implementing THz communications. In some scenarios, these sets of communication circuitry may be separate for each RAT, while in other scenarios some or all of the communication circuitry for implementing one RAT may be shared with one or more other RATs.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
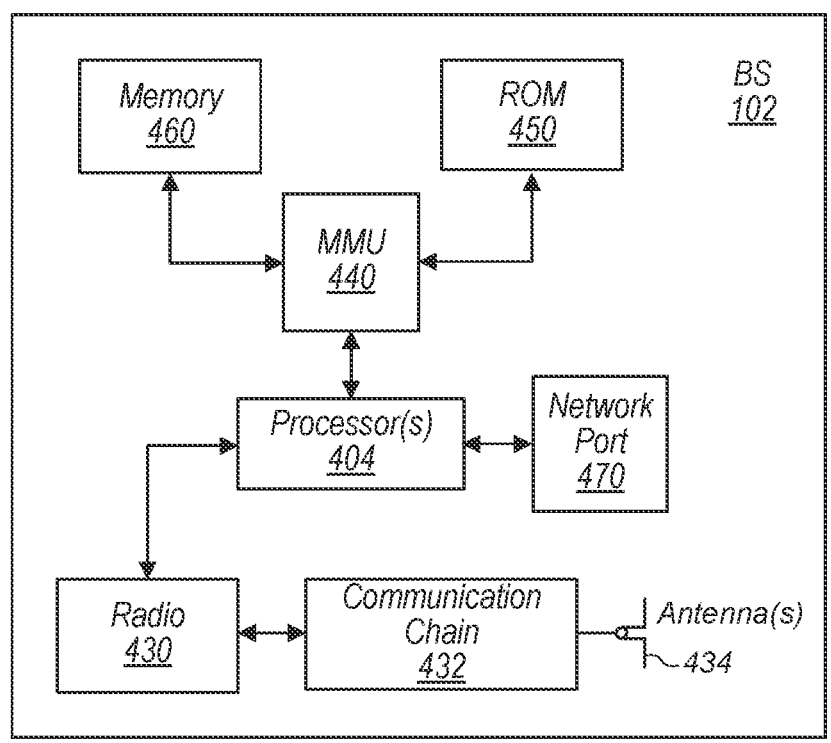
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE device 106 via radio 430. The antenna(s) 434 communicates with the radio 430 via communication chain 432. Communication chain 432 may be a receive chain, a transmit chain or both. The radio 430 may be designed to communicate via one or more of various wireless telecommunication standards, including, but not limited to, NR, LTE, LTE-A, THz network, WCDMA, CDMA2000, Wi-Fi, UWB, etc.

The base station 102 may include hardware and software components for utilizing a double-assisted THz network, such as described further subsequently herein. For example, the processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
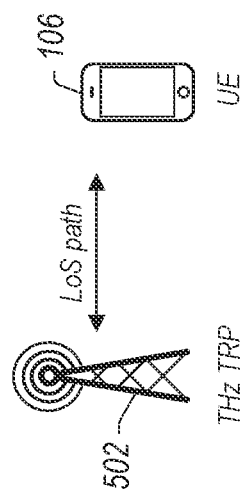
FIG. 5 illustrates an example of a THz band communication configuration with a direct LoS path, according to some embodiments.
Figure 6:
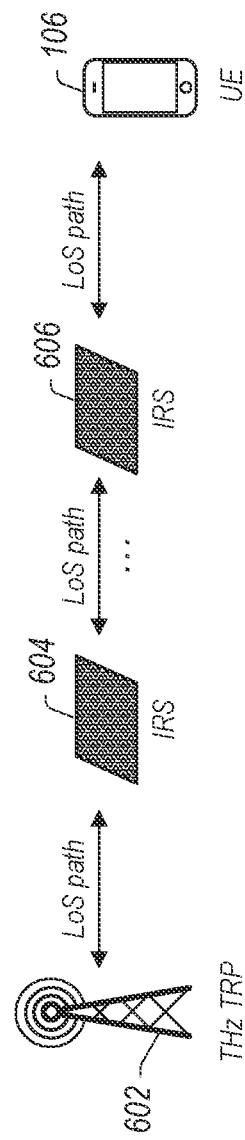
FIG. 6 illustrates an example of a THz band communication configuration with a multi-hop LoS path, according to some embodiments.
Figure 7:
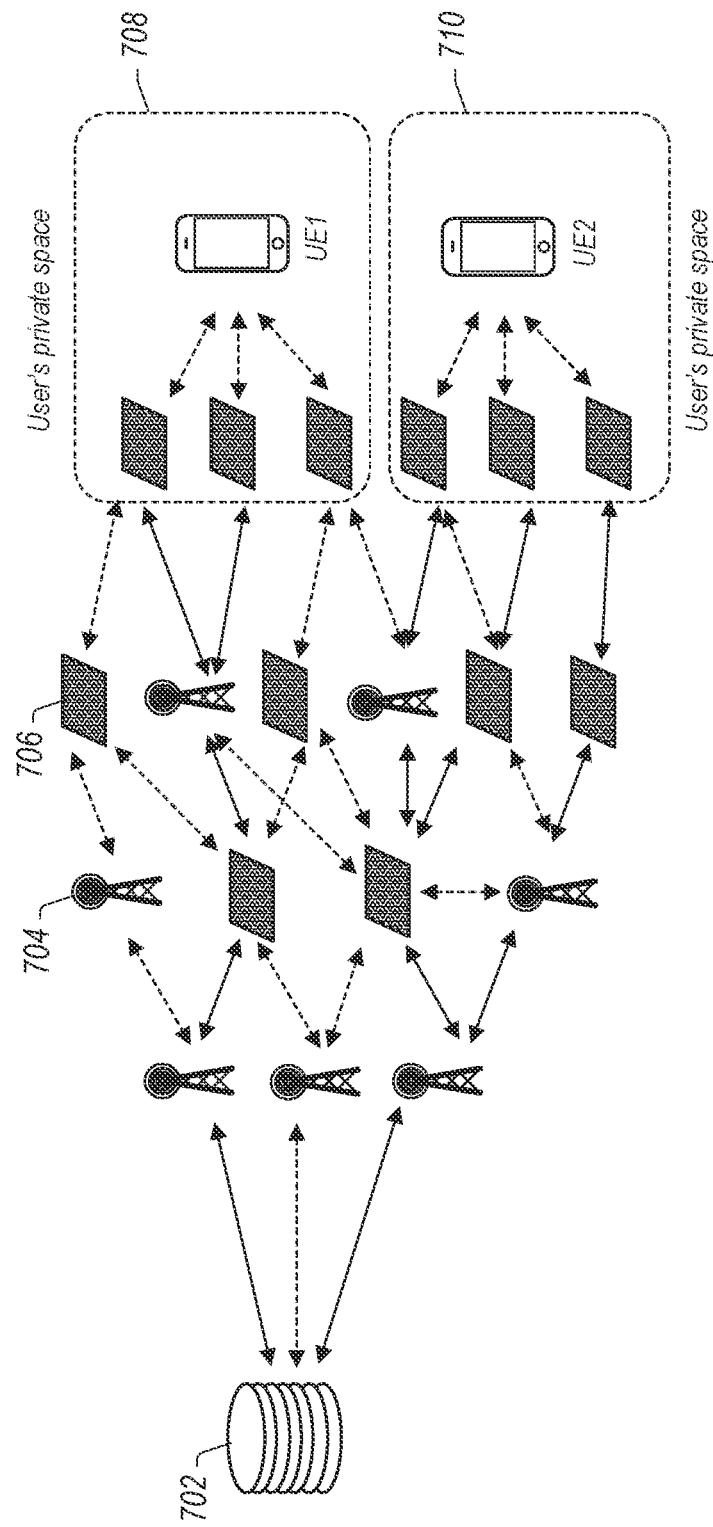
FIG. 7 illustrates an example of a THz band communication configuration with a multi-hop LoS path using a constellation of reflectors and repeaters, according to some embodiments.

FIGS. 5-7—THz Network Architectures

As wireless communication technologies continue to advance, new technologies have expanded into higher frequency ranges. For example, mmWave communications, such as those defined by 3GPP NR, may extend up to approximately 100 GHz. Communications at frequencies higher than that may be referred to as THz band communications. It may be noted that some sources may refer to the frequency range of 100 GHz through 1 THz as a sub-THz band, but within the present disclosure, the term "THz band" is intended to include that frequency range. In some scenarios, frequencies above 100 GHz may be divided into a plurality of "THz bands", with each band including a frequency range that may extend below and/or above 1 THz. Networks designed to operate within THz bands may be referred to as THz networks.

Signal propagation within the THz bands may manifest characteristics that differ significantly from lower bands. For example, THz band signals may require a line of sight (LoS) transmission path. THz band signals may therefore utilize highly-directed transmissions. This may lead to a low chance of interference and/or collision. THz band communications may be expected to utilize large bandwidths, allowing high data rates. However, THz band transmissions may have very high energy costs.

FIGS. 5-7 illustrate examples of THz band communication configurations. FIG. 5 illustrates an example of a THz band communication configuration in which a transmission and reception point (TRP) 502 of a THz network may utilize a direct LoS path to a UE, such as the UE 106, according to some embodiments. In some scenarios, the TRP 502 may be an example of (or may be included in) a base station, such as the base station 102. In such an example, the TRP 502 may transmit THz band signals to and/or receive signals from the UE 106 via the LoS path.

FIG. 6 illustrates an example of a THz band communication configuration in which a TRP 602 may utilize a multi-hop LoS path to the UE 106, according to some embodiments. In some scenarios, the TRP 602 may be an example of (or may be included in) a base station, such as the base station 102. In the example of FIG. 6, the TRP 602 may not have a direct LoS path to the UE 106, but may utilize a multi-hop LoS path via one or more reflector, such as an intelligent reflecting surface (IRS).

An IRS (also known as a configurable intelligent surface) may be, or include, a device having a surface that is reflective to electromagnetic radiation within a desired frequency range, wherein the device may change phase shift coefficients of the reflective surface so as to selectively change the angle of reflection.

By utilizing an IRS, the TRP 602 may establish a multi-hop LoS path to the UE 106, even if the TRP 602 does not have a direct LoS path to the UE 106, e.g., if an obstacle blocks the direct LoS path. As illustrated in FIG. 6, The TRP 602 has a direct LoS path to a first IRS 604, which in turn has a direct LoS path to a second IRS 606, which in turn has a direct LoS path to the UE 106. Thus, the TRP 602 may transmit a THz band signal directed toward the first IRS 604. The first IRS 604 may be configured to reflect the signal toward the second IRS 606. The second IRS 606 may be configured to reflect the signal toward the UE 106. The UE 106 may receive the signal. In this manner, the TRP 602 may transmit a THz band signal to the UE 106 via the two IRSs. The UE may similarly transmit a THz band signal to the TRP 602 via the two IRSs.

FIG. 7 illustrates an example of a THz band communication configuration in which a network node 702 may utilize a multi-hop LoS path to the UE 106 using a constellation of reflectors and/or repeaters, according to some embodiments. In some scenarios, the network node 702 may be an example of (or may be included in) a base station, such as the base station 102, or other network node. The constellation may include one or more reflectors, such as the IRS 706 (and other reflectors illustrated using the same graphic symbol). The constellation may also, or alternatively, include one or more repeaters, such as the repeater 704 (and other repeaters illustrated using the same graphic symbol).

In some scenarios, the network node 702 may be, or include, a L2 node, and the repeater 704 may be, or include a radio unit (RU) node, which may function as a simple physical layer (PHY) repeater. In other scenarios, the network node 702 may be, or include, an integrated access backhaul (IAB) donor node, and the repeater 704 may be, or include, an IAB node, which may include both PHY and Layer 2 (e.g., MAC/RLC) functionality. Other repeater configurations are also possible.

As illustrated in FIG. 7, the network node may communicate THz band signals to and/or from one or more UE via the constellation of reflectors and/or repeaters. As illustrated, a first UE is located within a user's private space 708, such as an office or other room or area controlled by the user. The user may deploy one or more reflectors within the private space 708 to facilitate THz band communications with the network node 702 located outside the private space 708. A second UE is similarly located within a second private space 710, which may also include one or more reflectors.

In the illustration of FIG. 7, arrows represent LoS paths between nodes of the constellation and/or a UE. Arrows having solid lines represent LoS paths that are currently in use for THz band communications, while arrows having dotted lines represent LoS paths that are available, but not currently in use. As illustrated, a repeater may transmit to and/or receive from another repeater and/or a reflector to which it has a direct LoS path. In some scenarios, a repeater may transmit to and/or receive from multiple other nodes in the constellation. Similarly, a reflector may reflect to and/or receive from another repeater and/or a reflector to which it has a direct LoS path. In some scenarios, a reflector may reflect to and/or from multiple other nodes in the constellation.

Because THz networks may require LoS path availability (either direct or multi-hop), such networks may not be suitable for providing full coverage for wireless communications. For example, a THz network may experience dead zones in which no LoS path to a TRP is available.

Additionally, because THz band communications are highly directional, establishment of a LoS path may include a beam alignment/tracking procedure, which may be expected to be expensive in terms of radio resource consumption and/or power consumption. Such resource/power overhead may not be worthwhile, if THz band communications are not sufficiently efficient; e.g., if data traffic is sparse and/or consists of small packets. In such scenarios, the efficiency of THz band communications may be low compared to legacy systems.

For these reasons, THz networks may not be well suited for some types of traffic. For example, they may not be well suited for control plane communications.

Figure 8:
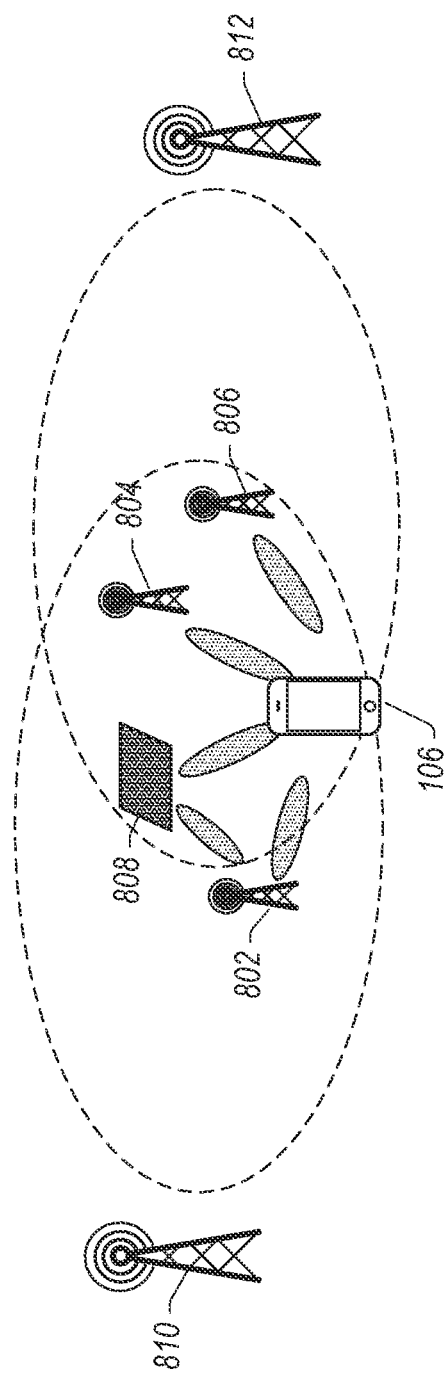
FIG. 8 illustrates an exemplary (and simplified) wireless communication system including a THz network and an assisting network, according to some embodiments.
Figure 9:
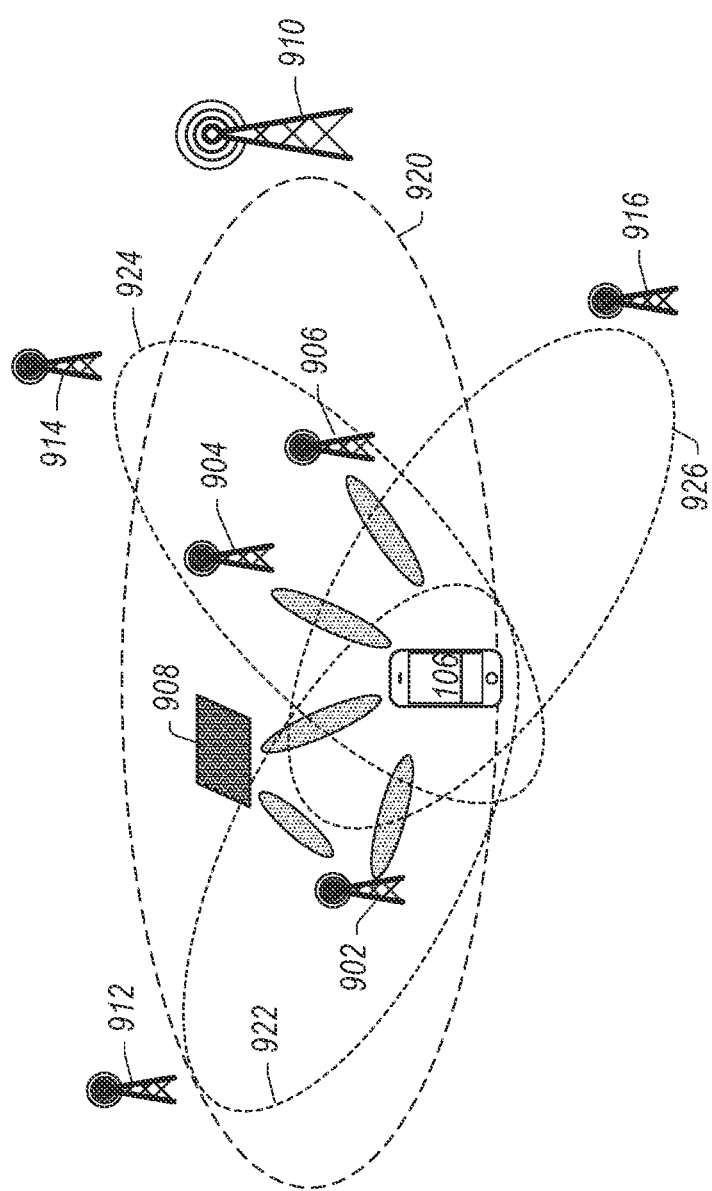
FIG. 9 illustrates an exemplary (and simplified) wireless communication system including a double-assisted THz network, according to some embodiments.

FIGS. 8-9—Assisted Network Architectures

To alleviate the deficiencies of a THz network, as outlined above, the THz network may be assisted by one or more other networks, such as legacy networks. FIG. 8 illustrates an example of a THz band communication configuration assisted by a legacy network, according to some embodiments.

In the example of FIG. 8, a UE, such as UE 106, may be capable of communicating with one or more nodes of a THz network. For example, nodes 802, 804, and 806 may be TRPs or repeaters in the THz network, with which the UE 106 may be in communication. In some scenarios, the THz network may also include one or more reflectors, such as the reflector 808, e.g., to facilitate THz band communications with node 802 or other nodes. The UE 106 may communicate with one or more nodes of the THz network via respective LoS paths, e.g., as illustrated in FIG. 8.

In the example of FIG. 8, the UE 106 may also communicate with a legacy network via base station 810 and/or base station 812. Such a legacy network may be used to assist the THz network, and may therefore be referred to as a narrowband (NB) assisting network (NBAN). A NBAN may be a full-coverage (or significantly close to full-coverage) network that implements control plane procedures. Such networks may be expected to utilize frequencies lower than those used by the THz network (e.g., below 100 GHz). In some scenarios, examples of networks that may serve as NBANs may include 5G NR, LTE, or Wi-Fi, among others. It should be understood that a NBAN may utilize a "narrow band" relative to the expected large bandwidth of the THz band; despite this nomenclature, the bandwidth of the NBAN may, in some scenarios, be typical for legacy networks.

In some scenarios, one or more of the nodes 802, 804, and/or 806 of the THz network may be colocated with the base station 810 or the base station 812 of the NBAN. In some scenarios, one or more nodes of the THz network may not be colocated with a base station of the NBAN.

In the example illustrated in FIG. 8, the THz network may be used to communicate large data transfers. However, the THz network may not be efficient for smaller data transfers. Thus, the NBAN may be utilized for communicating data when only small amounts of data are available to be communicated. The NBAN may also be utilized for communicating data when the UE is unable to establish a LoS path to a node of the THz network. Additionally, the NBAN may be used to provide control signaling for the THz network. The NBAN is therefore expected to be able to communicate in real-time (or near-real-time) with the THz network.

A NBAN may therefore alleviate some of the deficiencies of a standalone THz network. However, as noted above, a THz network may be expected to spend significant radio resources and/or power in beam alignment/tracking. Further refinements may be desired to address these concerns.

FIG. 9 illustrates a double-assisted network architecture, according to some embodiments. Such a double-assisted network architecture may present the benefits of the single-assisted network architecture of FIG. 8, and may also present additional benefits to reduce the demands of beam alignment/tracking in the THz network.

Similar to the architecture illustrated in FIG. 8, the architecture of FIG. 9 may include a UE 106 capable of communicating with one or more nodes of a THz network. For example, nodes 902, 904, and 906 may be TRPs or repeaters in the THz network, with which the UE 106 may be in communication. In some scenarios, the THz network may also include one or more reflectors, such as the reflector 908, e.g., to facilitate THz band communications with node 902 or other nodes. The UE 106 may communicate with one or more nodes of the THz network via respective LoS paths, e.g., as illustrated in FIG. 9.

In the example of FIG. 9, the UE 106 may also communicate with a NBAN via base station 910. The coverage area of the base station 910 (or a cell or beam of the base station)

is illustrated as ellipse 920. The NBAN may be a full-coverage (or significantly close to full-coverage) network that implements control plane procedures.

As in FIG. 8, the THz network of FIG. 9 may be used to communicate large data transfers, while the NBAN may be utilized for communicating data when only small amounts of data are available to be communicated and/or when the UE is unable to establish a LoS path to a node of the THz network. The NBAN may also be used to provide control signaling for the THz network.

Based on these targeted functions, good candidates for operation as a NBAN may be expected to utilize lower-frequency narrower band communications with broad area coverage. Examples of networks that may serve as NBANs may include sub-6 GHz 5G NR, LTE, or Wi-Fi, among others.

As illustrated in FIG. 9, the UE 106 may also communicate with a positioning assisting network (PAN) via one or more of PAN nodes 912, 914, and/or 916. The coverage areas (or a cell or beam thereof) of PAN nodes 912, 914, and or 916 are illustrated as ellipses 922, 924, and 926, respectively. The coverage areas of the PAN nodes 912, 914, and or 916 may overlap with the coverage areas of the NBAN base station 910 and the THz network nodes 902, 904, 906, and 908. As illustrated in FIG. 9, the Each of the nodes 912, 914, and or 916 may be, or include, or be included in, a base station, such as the base station 102, or a TRP or other network node. The PAN may be a legacy network that is able to provide high-precision positioning for UE 106. Examples of networks that may serve as PANs may include mmWave 5G NR, sub-6 GHz 5G NR, ultra wideband (UWB), or Wi-Fi, among others.

In some scenarios, one or more of the nodes 902, 904, and/or 906 of the THz network may be colocated with the base station 910 of the NBAN and/or with one or more of the nodes 912, 914, and/or 916 of the PAN. In some scenarios, one or more nodes of the THz network may not be colocated with a base station of the NBAN and/or a node of the PAN. Regardless of location of the nodes, the THz network, the NBAN, and the PAN are expected to be able to communicate in real-time (or near-real-time), e.g., via their respective core networks.

The PAN may operate to refine the PHY synchronization of the THz network by streamlining the beam alignment/tracking of the THz network. Specifically, the PAN may provide relative location information regarding the UE 106 and one or more nodes of the THz network constellation, such as the nodes 902, 904, and/or 906, and/or the reflector 908.

In some scenarios, the NBAN may first generate a list of THz nodes (e.g., TRPs and/or IRSs) that may be considered as candidate nodes for establishing a connection with the UE 106 on the THz network. E.g., the NBAN may use previous knowledge of the locations of the THz nodes (e.g., provided by the THz network and/or the PAN) to determine a list of candidates that may be close to a current position of the UE 106 (e.g., determined based on existing location-tracking capabilities of the NBAN) and/or are expected to have an unobstructed direct LoS path to the UE 106.

In some scenarios, the NBAN may sort the list of candidate nodes based on one or more metrics. Examples of such metrics may include estimated distance between the UE 106 and the respective candidate, variance of positioning estimations relative to the candidate node, and/or a machine-learning-based model predicting probability of success of the UE 106 connecting to the respective candidate node (e.g., based on the candidate node's visibility, channel measurements, etc.).

The NBAN may provide the (e.g., sorted) list to the PAN.

The PAN may then determine a more precise 3-dimensional position of the UE 106 relative to one or more (e.g., each) of the nodes included on the candidate list. For example, this may include determining an absolute position of the UE 106, e.g., using any method of direction and/or range finding available to the PAN, and calculating a relative position based on the determined absolute position of the UE 106 and the known positions of the candidate nodes. As another example, this may include determining a position of the UE 106 relative to a node of the PAN (such as node 912) and determining a position of the candidate node relative to the node of the PAN, and then calculating a relative position of the UE 106 relative to the candidate node based on their determined positions relative to the node of the PAN.

The PAN may provide the position information regarding a candidate node to the UE 106 and to the respective candidate node. A communication session between the UE 106 and the PAN may have been previously established via one or more of the nodes 912, 914, and/or 916. In some scenarios, the position information may also be provided to the NBAN, e.g., to update the order of the sorted candidate list, based on the enhanced position information. In some scenarios, the PAN may also provide additional information regarding the positioning information, such as an error distribution of the position estimation, or other information regarding error, accuracy, or precision estimates regarding the position estimation.

The UE 106 may determine its orientation relative to a candidate node, e.g., in response to receiving the measurement information regarding the candidate node from the PAN. This orientation determination may be performed using any known method, such as using unlicensed-band communications, and/or may be assisted by the PAN. In some scenarios, the UE 106 may provide information regarding the determined orientation to the PAN.

Upon receiving the position information for one of the candidate nodes of the THz network, the NBAN may schedule a beam alignment/tracking procedure for that candidate node. The NBAN may communicate scheduling information for the beam alignment/tracking procedure to the UE 106 and the THz network. A communication session between the UE 106 and the NBAN may have been previously established via the base station 910. The scheduling information may include timing and radio resource selection, and may in some scenarios include additional configuration information. The NBAN may transmit to the UE 106 all control information relevant to the UE 106 in connection with the beam alignment/tracking procedure. Specifically, the THz network may not transmit to the UE 106 control information for alignment/tracking of transmit beams on the THz network. In some scenarios, the NBAN may communicate the timing information to the candidate node via the core THz network.

In response to the scheduling information, the UE 106 and the candidate node may perform the beam alignment/tracking procedure on the THz network. The UE 106 and the candidate node may utilize the position information provided by the PAN, e.g., to determine an approximate beam direction. The UE 106 may also utilize the determined orientation relative to the candidate node, e.g., to determine an approximate beam direction to the candidate node. The beam alignment/tracking procedure may consume significant radio resources within the THz network, and may also consume significant power at the UE 106 and/or the candidate node. The amount of resources utilized will depend, in part, on the quality of the position information provided by the PAN. For example, if the position information identifying the position of the UE 106 relative to the candidate node is highly accurate and precise, then the UE 106 and the candidate node may be able to more quickly determine an appropriate beam configuration, which may reduce the duration of the beam alignment/tracking procedure. Thus, involving the PAN may yield a (potentially significant) net savings in power and radio resource usage, despite the overhead of determining the relative position information.

The specific beam alignment/tracking procedure to be performed may be selected from any known procedures, e.g., based on the antenna array used, available information regarding the estimation error distributions of the position information, independence between the estimation errors at the receiver and the transmitter, and/or other factors. For example, the procedure may be based on delayed-phase analog precoding (DPP), e.g., as disclosed by: J. Tan and L. Dai, "Wideband Beam Tracking Based on Beam Zooming for THz Massive MIMO," *GLOBECOM* 2020-2020 IEEE Global Communications Conference, 2020, pp. 1-6, doi: 10.1109/GLOBECOM42002.2020.9348222. As another example, the procedure may be based on leaky-wave antenna (WLA), e.g., as disclosed by: J H. Saeidi, S. Venkatesh, X. Lu and K. Sengupta, "THz Prism: One-Shot Simultaneous Localization of Multiple Wireless Nodes With Leaky-Wave THz Antennas and Transceivers in CMOS," in *IEEE Journal of Solid-State Circuits, vol.* 56, no. 12, pp. 3840-3854, December 2021, doi: 10.1109/JSSC.2021.3115407. Each of these references is hereby incorporated by reference as if fully and completely disclosed herein.

If the candidate node is an IRS, the THz network may determine phase shift coefficients to configure the IRS to reflect a transmission from the UE 106 to another desired node in the THz constellation (or vice versa). This determination may be based on the relative position information of the UE 106 relative to the candidate IRS, as provided by the PAN, as well as known position information of the other desired node, e.g., relative to the candidate IRS. The THz network may provide the determined phase shift coefficients to the candidate IRS, and the candidate IRS may apply the coefficients to configure its reflective surface accordingly.

After the UE 106 and the candidate node have performed the beam alignment/tracking procedure on the THz network, the UE 106 and/or the candidate node may notify the NBAN whether the procedure was successful. If the beam alignment/tracking procedure fails, it may be assumed that a LoS path between the UE 106 and the candidate node does not exist.

In some scenarios, the NBAN may schedule a beam alignment/tracking procedure for more than one (e.g., all) of the candidate nodes included on the candidate list. For example, the NBAN may schedule a beam alignment/tracking procedure for a second candidate node in response to failure of a beam alignment procedure for a first candidate node. As another example, the NBAN may schedule a beam alignment/tracking procedure for one or more additional candidate nodes, despite a successful beam alignment/tracking procedure for a first candidate node, e.g., in anticipation that the LoS path to the first candidate node may be lost due to movement of the UE 106 and/or movement of some obstacle. In some scenarios, the NBAN may distribute separate beam alignment/tracking procedures for various candidate nodes over time, e.g., to avoid consuming too many resources within a short time window.

The NBAN may determine the resources to schedule based at least in part on the position information received from the PAN. For example, the NBAN may prioritize scheduling for a candidate node that seems likely to successfully perform a beam alignment/tracking procedure, based on the position information. As another example, the resources scheduled may be based at least partly on the error distribution or other error/accuracy information included in the position information, as such information may inform how long the candidate node is likely to take to complete a beam alignment/tracking procedure with the UE 106.

In some scenarios, the NBAN may also schedule a pilot-based beam refinement procedure on the THz network for one or more of the candidate nodes. For example, the NBAN may schedule a sounding reference signal (SRS) or channel state information reference signal (CSI-RS) procedure. Such a procedure may further refine the beam alignment.

For a given candidate node, the beam alignment/tracking procedure and/or pilot-based beam refinement may be repeated, e.g., periodically, to maintain beam alignment over time.

Following a successful beam alignment/tracking procedure and/or pilot-based beam refinement for at least one candidate node, the NBAN may provide control information to initiate and manage higher-level synchronization and/or data transmission/reception between the UE 106 and the THz network via the at least one candidate node. Based on the control information, the UE 106 and the candidate node may transmit/receive data communications on the THz network.

Figure 10:
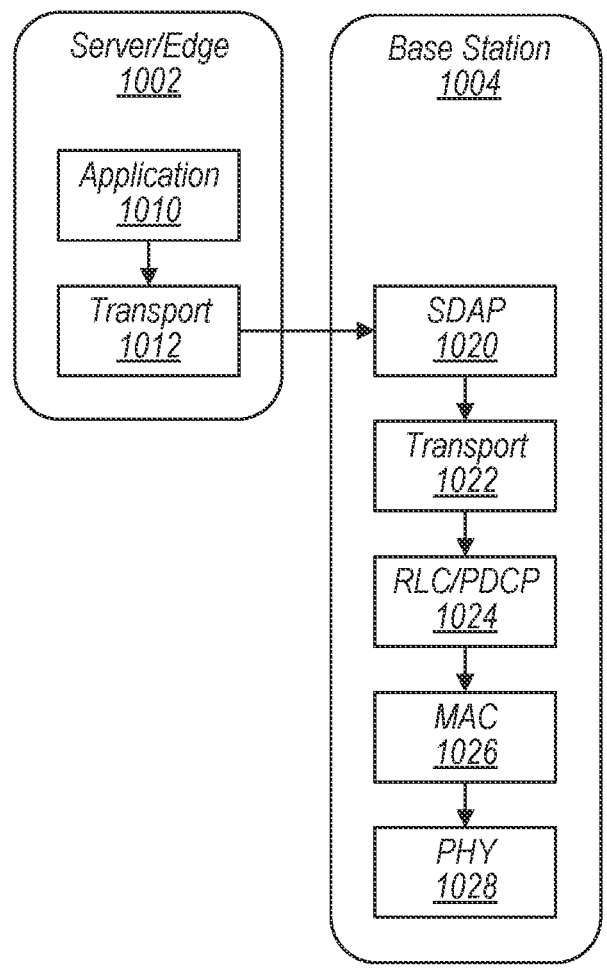
FIG. 10 is a block diagram illustrating a simplified representation of a portion of an example protocol stack of a THz network, according to some embodiments.

FIG. 10—THz Network Protocol Design

To accommodate the close integration of the NBAN and the PAN with the THz network, unique activity states may be defined for the UE 106 in connection with the double-assisted THz network. Specifically, the UE 106 may be configured according to any of at least a THz-Idle state, a THz-Connected state, or a THz-Active state. Similar states may also be used for nodes of the THz network, such as a THz network base station, TRP, L2 node, IAB node, or IAB donor node.

In the THz-Idle state, the UE 106 may not be connected to the THz network. The UE 106 may be connected to one or more other networks, via other radio access technologies (RATs), such as the NBAN and/or the PAN. The UE 106 may obtain control and/or synchronization messages regarding the THz network through the NBAN. In the THz-Idle state, the UE 106 may not be aware of UE positioning relative to the THz network.

As a result of these conditions of the THz-Idle state, the UE 106 does not consume resources of the THz network. Additionally, no resources are consumed on the PAN in support of the THz network.

In the THz-Connected state, the UE 106 may be preparing for connection to the THz network. The UE 106 is not connected to the THz network, but is connected to the NBAN and the PAN. The UE 106 may obtain relative positioning information regarding candidate nodes of the THz network from the PAN, and the THz network may obtain relative positioning information regarding the UE 106.

As in the THz-Idle state, the UE 106, while in the THz-Connected state, does not consume resources of the THz network. Resources may be consumed on the PAN in support of the THz network, e.g., by determining positioning information of the UE 106 relative to the THz network nodes. Resources may also be consumed on the NBAN for control signaling in support of the THz network.

In the THz-Active state, the UE 106 is connected (or in the process of connecting) to the THz network. In this state, the UE 106 may perform beam alignment/tracking and (if applicable) beam refinement with one or more nodes of the THz network. After such synchronization procedures, both the UE 106 and one or more nodes of the THz network may have aligned (and perhaps refined) narrow beams for transmission and/or reception. While the UE is in this state, the NBAN may schedule data for transmission on the THz network.

In the THz-Active state, the UE 106 may consume resources on the THz network, e.g., for data transmission/reception and beam alignment/tracking. These processes may also incur significant power consumption. Resources may also be consumed on the NBAN in support of the THz network, e.g., for control signaling for beam alignment and data transmission. Thus, the THz-Active state may be expensive in terms of power and radio resource consumption.

For this reason, a goal of the THz network protocol design may be to minimize time spent by the UE 106 in the THz-Active state.

To facilitate this goal, the THz network protocol design may include a transport buffer at L2, e.g., in the UE 106 and/or a THz network node. Specifically, it may be expected that THz band communications may operate with large bandwidths, allowing very high data rates, but with high power and resource consumption rates. Thus, the THz network may be very inefficient if the UE 106 remains in the THz-Active state for an extended period of time, in order to transfer a series of packets each containing a small amount of data. To achieve a higher level of efficiency, the UE 106 may remain in the THz-Idle state and/or the THz-Connected state until a sufficiently large amount of data has been buffered in the L2 transport buffer for transmission as a brief, large data transmission. However, application layer CQI and/or service requirements may provide practical constraints on how long data may be buffered between transmission.

FIG. 10 is a block diagram illustrating a simplified representation of a portion of an example protocol stack of the THz network, according to some embodiments.

FIG. 10 shows a server/edge node 1002 of the THz network in communication with a base station 1004 of the THz network. The base station 1004 may be, or include, or be included in a base station 102.

As illustrated, the server/edge node 1002 may include an application layer 1010, which may output application protocol data unit (PDU) to a transport layer 1012 of the server/edge node 1002. The transport layer 1012 may pass transport packets including portions of the application PDU to a Service Data Adaptation Protocol (SDAP) layer of the base station 1004, e.g., as currently defined for 3GPP NR. The SDAP layer may provide output to a L2 transport buffer 1022 within the base station 1004. The transport buffer 1022 may accumulate the incoming data until some appropriate trigger is reached.

It may be noted that, when the UE 106 receives from the base station 1004 a series of packets related to the same application PDU, the UE 106 may not effectively utilize the received data until the UE 106 has received and assembled the entire application PDU. Therefore, the base station 1004 may safely buffer data at the L2 transport buffer 1022 until it is prepared to transmit an entire application PDU.

The transport buffer 1022 may serve as a counterpart for the server transport protocol node. For example, it may generate acknowledgements for use in TCP congestion control, which is based on server-to-BS capacity. The transport PDUs may be buffered and assembled into Application PDU within the transport buffer 1022. The transport buffer may then provide the assembled (or nearly assembled) application PDU to the lower layer.

To avoid violating timing constraints, such as application layer CQI and/or service requirements, the base station 1004 may be configured to transmit the data from the transport buffer 1022 as soon as possible, while accommodating transmission of the entire application PDU. However, the base station 1004 may also be configured to pursue the goal of minimizing time spent in the THz-Active state. To reconcile these two goals, the base station 1004 may begin to transition to the THz-Active state shortly before the entire application PDU has reached the transport buffer 1022. Specifically, the base station 1004 may begin to transition to THz-Active state at a time $T_{toActive}$, which may be defined according to Equation 1:

$$T_{toActive} = T_{assembly} - T_{beamAlign} - T_{transmission} \quad \text{Equation 1}$$

In equation 1, $T_{assembly}$ is the estimated time at which the application PDU will be assembled in the transport buffer 1022. $T_{beamAlign}$ is the estimated time required for the base station 1004 to perform beam alignment (and beam refinement, if applicable). $T_{transmission}$ is the estimated time required for transmission of the application PDU. These time estimates may be generated by the MAC layer. In some scenarios, machine learning and/or artificial intelligence models may be utilized to generate accurate estimates.

Returning to FIG. 10, when the application PDU is assembled in the transport buffer 1022, it may be passed to the RLC/PDCP layer 1024. As an added benefit of the transport buffer 1022, passing assembled application PDUs may allow for a simplified RLC/PDCP layer.

The application PDU may then be passed through the MAC layer 1026 and the PHY layer 1028, and may be transmitted to the UE 106 on the THz network in one or more transport blocks.

A similar procedure may be performed by the UE 106 to transmit to a node of the THz network.

Scheduling policy at the NBAN may also impact the time the UE 106 and/or the THz network node remain in the THz-Active state. A goal for the NBAN may be to perform scheduling so as to minimize the sum of the time that all devices scheduled for communication via the THz network spend in the THz-Active state. Optimal scheduling policies for achieving this goal may be based on shortest remaining processing time (SRPT policies. For example, in the presence of a plurality of UEs operating on the THz network, the UE having the shortest remaining transmission time may be given priority to transmit first. After completing transmission, that UE may then transition out of the THz-Active state, and another UE may be given priority to transmit; e.g., the UE having the next shortest remaining transmission time.

Such policies may not be viable in legacy systems, as they may require knowledge of the size of the transmission task, which information is traditionally not available to the scheduler in legacy systems. However, use of the L2 transport buffer 1022 may make such information available. For example, the base station 1004 may communicate buffer status information to the NBAN (e.g., directly or via the THz network core). More generally, the NBAN may schedule resources for transmission on the THz network in response to determining, based on an estimation provided by the THz network and/or the UE 106, of when the L2 transport buffer (e.g., transport buffer 1022) of the base station 1004 or the UE 106 will assemble a complete application PDU.

In some scenarios, the application layer 1010 may be made aware of characteristics of the THz network used for transmission of the application PDUs. In such scenarios, the application layer 1010 may be configured to improve (e.g., optimize) application PDU parameters to further facilitate reduction of time spent in the THz-Active state. For example, the application layer 1010 may modify (e.g., increase) the size of the application PDU, e.g., to better match transport block size of the THz network.

FIG. 11—Personal IRSs in a Dual-Assisted THz Network

As illustrated in FIG. 7 (elements 708 and 710), a user may control a personal space from which communication via a THz network may be desirable. In some scenarios, a THz network constellation may include one or more IRSs that act as known nodes within the constellation. However, as THz networks become more popular, it is foreseeable that users may deploy personal IRSs to improve coverage, e.g., within a private space. For example, a user may position an IRS at an entryway to an office or other room, to extend a multi-hop LoS path into the room. Such personal IRSs may not be known to the THz network.

In some scenarios, a UE coupled with one or more personal IRSs (e.g., as illustrated at element 708) may be considered a "virtual UE." For example, the personal IRSs may be positioned so as to reflect incoming THz network signals to the UE. As a result, the THz network constellation may successfully create a LoS path to the UE by completing a LoS path to any one of the IRSs. Thus, from the perspective of the THz network, establishing a LoS path to any IRS of the virtual UE may be considered equivalent to establishing a LoS path to the UE. Within a virtual UE, the UE may be responsible to configure the phase shift coefficients of the IRS to ensure a proper angle of reflection to establish a multi-hop LoS.

The concepts of personal IRSs and virtual UEs are described in greater detail in U.S. Provisional Patent Application 63/342,489, which is hereby incorporated by reference as if fully and completely set forth herein.

Figure 11A:
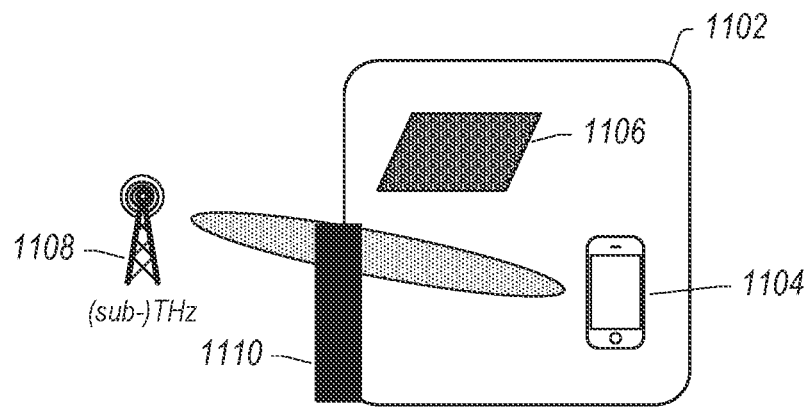
FIGS. 11A-11B illustrate examples of virtual UEs operating within a double-assisted THz network, according to some embodiments.
Figure 11B:
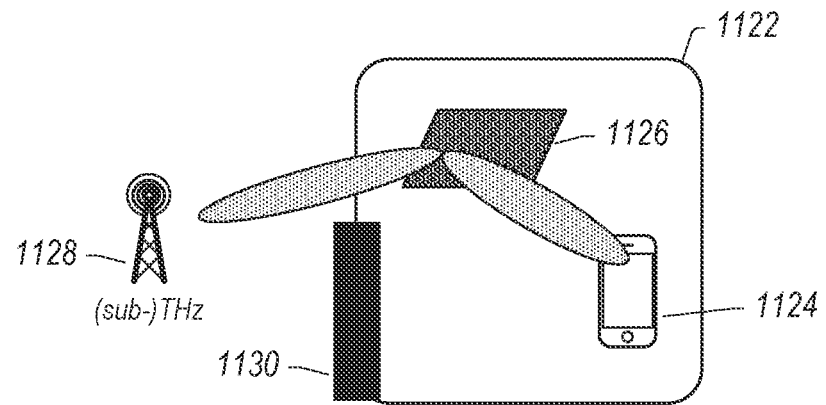

However, within the context of a double-assisted THz network, a virtual UE may introduce additional complications. FIGS. 11A-11B illustrate examples of virtual UEs operating within a double-assisted THz network, according to some embodiments.

As illustrated in FIG. 11A, a virtual UE 1102 may include a UE 1104, which may be similar or equivalent to the UE 106, and an IRS 1106. Node 1108 of the THz network may be a base station, such as the base station 102, or may be a TRP, RU, IAB, or other network node. Node 1108 may have a direct LoS path to the IRS 1106, but may be blocked from a direct LoS path to the UE 1104 by obstacle 1110.

In the scenario of FIG. 11A, the NBAN may identify the node 1108 as a candidate node, and in response the PAN may provide position information regarding the position of the UE 1104 relative to the node 1108. However, because the IRS 1106 is a personal IRS within the virtual UE 1102, it may not be known to the THz network (or to the PAN or NBAN). As a result, the PAN may provide to the node 1108 relative position information only for the UE 1104, and not for the IRS 1106. Similarly, the PAN may provide to the UE 1104 relative position information only for the node 1108, and not for the IRS 1106. When the node 1108 and the UE 1104 attempt to perform beam alignment/tracking, the procedure may fail because the obstacle 1110 blocks the direct LoS path.

The physical layout of the scenario of FIG. 11B may be similar to that of FIG. 11A. As illustrated, a virtual UE 1122 may include a UE 1124, which may be similar or equivalent to the UE 106, and an IRS 1126. Node 1128 of the THz network may be a base station, such as the base station 102, or may be a TRP, RU, IAB, or other network node. Node 1128 may have a direct LoS path to the IRS 1126, but may be blocked from a direct LoS path to the UE 1124 by obstacle 1130.

In the scenario of FIG. 11B, the UE 1124 may overcome the shortcomings of the scenario of FIG. 11A by determining a position of the IRS 1126 relative to the UE 1124. The UE 1124 may provide information regarding the relative position of the IRS 1126 to the PAN and/or to the NBAN. In scenarios in which a plurality of personal IRSs are included in a virtual UE, the UE 1124 may provide a list of IRSs with respective position information. In some scenarios, the PAN may provide information received from the UE 1124 regarding the IRS 1126 (and other personal IRSs, if applicable) to the NBAN.

Using the information provided by the UE 1124, the NBAN may evaluate a probability of a LoS path existing from the node 1128 to the IRS 1126. Based on the evaluation, the NBAN may schedule a beam alignment/tracking procedure for synchronization between the UE 1124 and the node 1128 via the IRS 1126. The UE 1124 may provide phase shift coefficients to the IRS 1126 to cause the IRS 1126 to be configured to reflect communications between the UE 1124 and the node 1128. The UE 1124 may determine the phase shift coefficients based on the relative position of the IRS 126, as determined by the UE 1124, and the position information of the node 1128, as provided to the UE 1124 by the PAN.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device comprising:
first communication circuitry configured to communicate with a first wireless communication network according to a first radio access technology (RAT), wherein the first communication circuitry is configured to:
receive information indicating a position, relative to the UE, of a network node of a third wireless communication network;
second communication circuitry configured to communicate with a second wireless communication network according to a second, different RAT, wherein the second communication circuitry is configured to:
receive scheduling information from a network node of the second wireless communication network, the scheduling information indicating resources to be used by the UE device for performing a beam alignment procedure with the network node of the third wireless communication network; and
third communication circuitry configured to communicate with the third wireless communication network according to a third, different RAT, wherein the third communication circuitry is configured to:
perform the beam alignment procedure with the network node of the third wireless communication network according to the scheduling information.

2. The UE device of claim 1, wherein communications according to the third RAT are limited to line-of-sight (LoS) communications.

3. The UE device of claim 2, wherein the LoS communications include multi-hop LoS communications.

4. The UE device of claim 1, wherein the third RAT is limited to communication frequencies above 100 GHz.

5. The UE device of claim 1, wherein:
the first communication circuitry is configured to receive information indicating respective positions, relative to the UE, of a plurality of network nodes of the third wireless communication network;
the second communication circuitry is configured to receive scheduling information indicating respective resources to be used by the UE device for performing beam alignment procedures with a plurality of network nodes of the third wireless communication network; and
the third communication circuitry is configured to perform the respective beam alignment procedures with the plurality of network nodes of the third wireless communication network according to the scheduling information.

6. The UE device of claim 1, wherein:
the second communication circuitry is further configured to receive second scheduling information from the network node of the second wireless communication network, the second scheduling information indicating resources to be used by the UE device for communicating payload data to and/or from the network node of the third wireless communication network; and
the third communication circuitry is further configured to transmit and/or receive the payload data to/from the network node of the third wireless communication network according to the third RAT.

7. The UE device of claim 1, wherein:
the first communication circuitry is further configured to provide information indicating a position, relative to the UE device, of an intelligent reflecting surface (IRS) associated with the UE device; and
the UE device further comprises a processor configured to determine phase shift coefficients for use by the IRS to configure the IRS to reflect communication beams between the UE device and the network node of the third wireless communication network, wherein the phase shift coefficients are determined based on the information indicating the position of the IRS and the information indicating the position of the network node of the third wireless communication network.

8. The UE device of claim 1, wherein the second communication circuitry is further configured to provide, to the network node of the second wireless communication network, an indication of whether the beam alignment procedure was successful.

9. A method for controlling communications on a THz band wireless communication network by an assisting network, the method comprising:
by the assisting network:
establishing a wireless communication connection with a user equipment (UE) device according to a first radio access technology (RAT);
determining a set of nodes of the THz band wireless communication network to be considered as candidates for establishing a connection with the UE device according to a second RAT, the second RAT being supported by the THz band wireless communication network;
identifying the determined set of nodes to a positioning network that operates according to a third RAT;
receiving, from the positioning network, position information for the nodes of the determined set of nodes, the position information indicating the positions of the nodes relative to the UE device;
scheduling resources for the UE device to perform a beam alignment procedure with a first node of the determined set of nodes according to the second RAT, wherein the resources are scheduled based at least in part on the position information; and
transmitting an indication of the scheduled resources to the UE device according to the first RAT.

10. The method of claim 9, further comprising:
communicating an indication of the scheduled resources to the first node.

11. The method of claim 9, further comprising:
receiving an indication that the beam alignment procedure was successfully performed between the UE device and the first node; and
after receiving the indication, scheduling resources for transmission of payload data between the UE device and the first node according to the second RAT.

12. The method of claim 11, further comprising:
receiving, from the THz band wireless communication network, information regarding transport buffer status of the first node, wherein the resources for transmission of payload data are scheduled to allow transmission of a complete application protocol data unit (PDU).

13. The method of claim 9, wherein the set of nodes is determined based on an estimation of likelihood that the nodes can establish a line-of-sight (LoS) path to the UE device.

14. A method for establishing communications on a THz band wireless communication network, the method comprising:
by a node of the THz band wireless communication network:
receiving, from a positioning network, information indicating a position of a user equipment (UE) device, relative to the node;
receiving, from an assisting network, scheduling information indicating resources of the THz band wireless communication network to be used by the node for performing a beam alignment procedure with the UE device; and
performing the beam alignment procedure with the UE device using the indicated resources.

15. The method of claim 14, wherein communications on the THz band wireless communication network are limited to line-of-sight (LoS) communications.

16. The method of claim 15, wherein the LoS communications include multi-hop LoS communications.

17. The method of claim 14, wherein communications on the THz band wireless communication network are limited to communication frequencies above 100 GHz.

18. The method of claim 14, further comprising:
receiving, from the assisting network, second scheduling information indicating resources to be used by the node for transmitting payload data to the UE device on the THz band wireless communication network; and
transmitting the payload data to the UE device using the indicated resources.

19. The method of claim 14, further comprising:
informing the assisting network whether the beam alignment procedure was successful.

20. The method of claim 14, further comprising:
providing to the assisting network an estimate of when a L2 transport buffer of the node will assemble a complete application PDU, the estimate usable by the assisting network in determining resource scheduling.

\* \* \* \* \*